United States Patent [19]

Kawasaki et al.

[11] Patent Number: 5,480,739
[45] Date of Patent: Jan. 2, 1996

[54] SOLID OXIDE FUEL CELLS AND PROCESS FOR THE PRODUCTION OF THE SAME

[75] Inventors: Shinji Kawasaki, Nagoya; Shigenori Ito, Kasugai, both of Japan

[73] Assignee: NGK Insulators, Ltd., Japan

[21] Appl. No.: 124,659

[22] Filed: Sep. 9, 1993

[30] Foreign Application Priority Data

Sep. 18, 1992 [JP] Japan ..................... 4-249834

[51] Int. Cl.$^6$ ............................. H01M 8/02; H01M 8/10; H01M 8/12
[52] U.S. Cl. .................. 429/33; 429/30; 429/31; 429/32; 29/623.5; 427/115
[58] Field of Search .............................. 427/115, 30, 33, 427/31, 32; 29/623.5

[56] References Cited

U.S. PATENT DOCUMENTS

| | | |
|---|---|---|
| 3,525,646 | 8/1970 | Tannenberger et al. . |
| 4,397,893 | 8/1983 | Bottoms . |
| 4,629,537 | 12/1986 | Hsu .................................. 427/115 |
| 5,051,321 | 9/1991 | Kitagawa et al. ................ 427/115 |
| 5,085,724 | 2/1992 | Dollard et al. ................... 427/115 |
| 5,234,722 | 8/1993 | Ito et al. ........................... 29/623.5 |
| 5,281,490 | 1/1994 | Nishioka et al. ................. 429/30 |

FOREIGN PATENT DOCUMENTS

| | | |
|---|---|---|
| 0476808 | 3/1992 | European Pat. Off. . |
| 0497542 | 8/1992 | European Pat. Off. . |
| 0513982 | 11/1992 | European Pat. Off. . |
| 0524013 | 1/1993 | European Pat. Off. . |

OTHER PUBLICATIONS

Extended Abstracts, vol. 93, No. 1, 16 May 1993, Princeton, New Jersey, U.S., p. 1609, S. Kawasaki et al. "microstructure and Properties of Lanthanum Chromite Film Prepared by Thermal Spray–Sintering Process".

Thermal Spray: International Advances In Coatings Technology—Proc. Int. Therm Spray Conf., 13th 28 May–5 Jun. 1992; Florida, USA; pp. 105–110, F. Uchiyama et al. "Ceramic Coating Technique Using Laser Spray Process for Solid Oxide Fuel Cells".

Primary Examiner—Stephen Kalafut
Assistant Examiner—Carol Chaney
Attorney, Agent, or Firm—Parkhurst Wendel & Rossi

[57] ABSTRACT

A solid oxide fuel cell including at least one kind of an electrically conductive film formed by spraying and having a permeability constant of nitrogen gas being not more than $9\times10^{-8}$ cm$^4$/g.sec. A process for producing a solid oxide fuel cell, including the steps of: forming a sprayed film on a substrate by spraying a material for the formation of an electrically conductive film, while a thickness of a sprayed film per one pass of a spraying gun is being suppressed to not more than 10 μm, and then forming the electrically conductive film by thermally treating the sprayed film.

16 Claims, 6 Drawing Sheets

FIG_1

FIG_5a
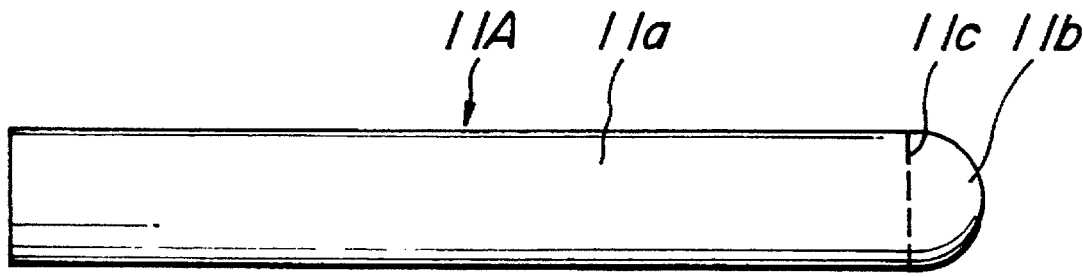
FIG_5b
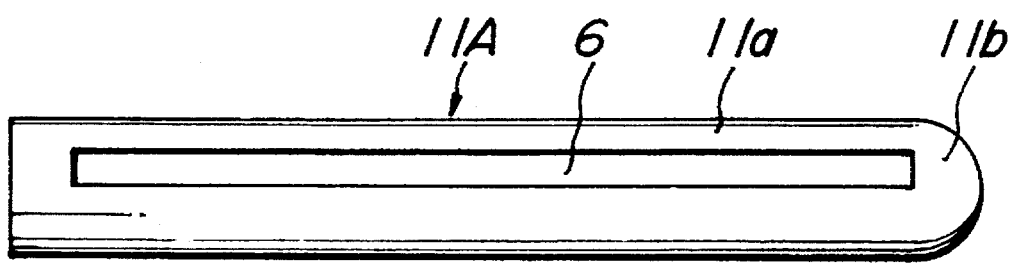
FIG_5c
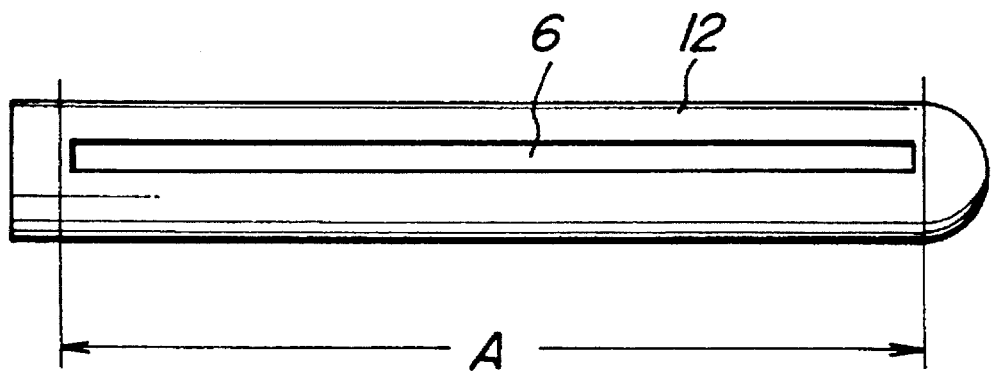

FIG_7
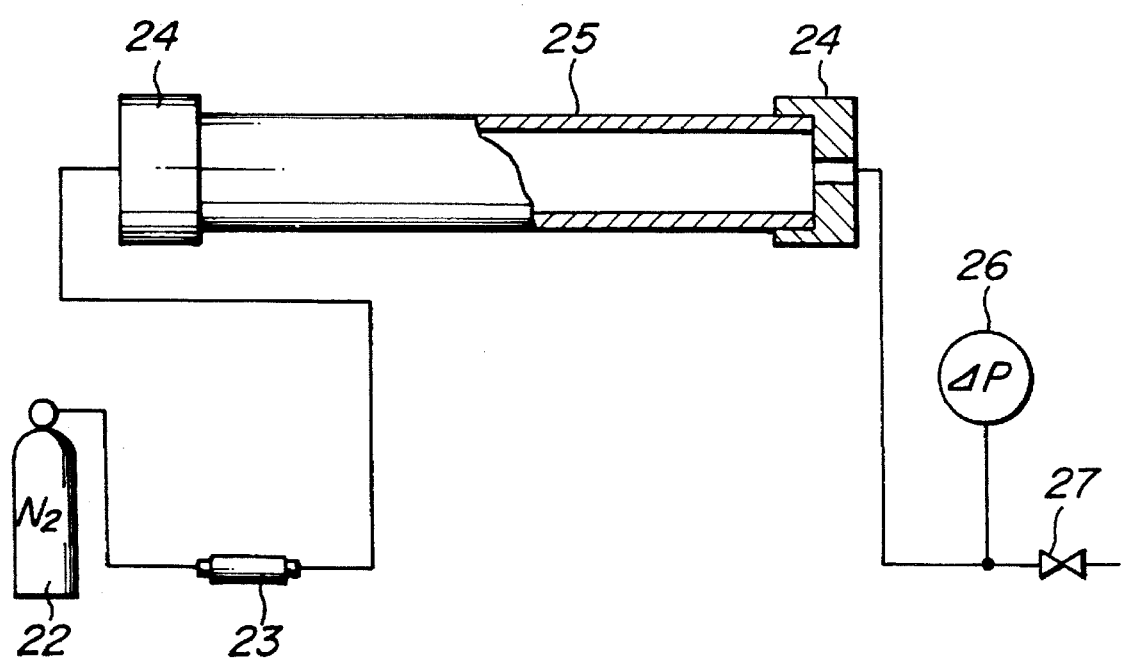

5,480,739

SOLID OXIDE FUEL CELLS AND PROCESS FOR THE PRODUCTION OF THE SAME

BACKGROUND OF THE INVENTION (1) Field of the Invention

The present invention relates to the solid oxide fuel cells and the production thereof.

(2) Related Art Statement

Since the solid oxide fuel cells (SOFCs) operate at high temperatures of around 1,000, their electrode reaction is extremely active, and a catalyst such as a noble metal such as precious platinum needs not be used at all. Further, since polarization is low and output voltage is relatively high, energy-converting efficiency is far greater as compared with fuel cells of other types. In addition, since constituent materials of the SOFC are all solid, the SOFC is stable, and has a long service life.

The solid electrolyte film is generally formed by the dry process or the wet process. As typical dry processes, an EVD process and a spraying process may be recited. As the wet process, a tape casting process, a slip casting process, and an extruding process may be recited (Energy General Engineering No.13-2, 1990).

If the gas phase process such as a chemical vapor deposition (CVD) process or an electrochemical vapor deposition (EVD) process is employed, the size of a film-forming device becomes larger, and a treatable area and a treating speed are too small. Furthermore, since zirconium chloride or the like is used or steam is used in a mixed state with oxygen, running cost becomes higher.

If the solid electrolyte film is formed by plasma spraying, the film-forming speed can be made greater and handling of the film-forming device is easy. In addition, the thin film can be relatively densely formed. For this reason, the plasma spraying technique has been employed in recent years (Sunshine 1981, Vol. 2, No. 1, Energy General Engineering 13-2, 1990).

However, porosity of the solid electrolyte film formed by the plasma spraying is generally more than 5%, and may be up to 10%. Consequently, such a film has insufficient density as a solid electrolyte film for the SOFC, and therefore, cracks or a stratified defect occur in the film during plasma spraying. Owing to this, a fuel such as hydrogen or carbon monoxide penetrates the solid electrolyte film during operation of the SOFC, so that an electromotive force per SOFC becomes smaller as compared with a case where no such fuel penetration occurs. Consequently, the output of the SOFC drops and the rate for converting the fuel to power decreases.

Furthermore, fuel electrodes and air electrodes of adjacent cell units of the SOFC are generally connected to each other in series through an interconnector and a connecting terminal. Therefore, it is desired that the interconnector is made thinner to reduce its electric resistance. On the other hand, since the interconnector functions to separate the oxidizing agent from the fuel, gas-tightness is required.

SUMMARY OF THE INVENTION

It is an object of the present invention to enable the formation of a thin solid electrolyte film and/or a thin interconnector on the surface of an electrode in the production of an SOFC and to enable mass production of such solid electrolyte films and/or such interconnectors.

More specifically, the present invention relates to a solid oxide fuel cell including at least one kind of an electrically conductive film formed by spraying and having a permeability constant of nitrogen gas being not more than $9\times10^{-8}$ $cm^4/g.sec$.

Further, the present invention relates to a process for producing a solid oxide fuel cell, comprising the steps of: forming a sprayed film on a substrate by spraying a material for the formation of an electrically conductive film, while a thickness of a sprayed film formed per one pass of a spraying gun is being suppressed to not more than 10 µm, and then forming said electrically conductive film by thermally treating said sprayed film.

According to the present invention, since the sprayed film made of the material for the formation of the electrically conductive film is thermally treated, open pores of this sprayed film can be converted to closed pores, fine cracks or defects peculiar to the plasma-sprayed film can be eliminated, and relative density can be increased to lessen porosity and realize gas-tightness. In addition, the crystalline phase of the film can be converted to a uniform, single phase by the thermal treatment, so the film can be made uniform as viewed microstructurally. Moreover the thermal treatment results in increased electronic conductivity of the electrically conductive film. As a result, leakage of a fuel through the electrically conductive film can be prevented, the gas-tight electrically conductive film can be made thinner, the internal resistance of the cell unit can be reduced, and output from the cell unit can be increased.

Furthermore, the present inventors' further research revealed that when the electrically conductive film is formed by using the spraying gun, while the thickness of a film formed per one pass of the spraying gun is being suppressed to not more than 10 µm, an electrically conductive film having extremely high gas-tightness and good film quality can be obtained by the combination of such suppressing control and the succeeding thermal treatment. More concretely, the permeability constant of nitrogen gas being not more than $9\times10^{-8}$ $cm^4/g.sec$ can be first realized in such sprayed films.

Moreover, the present invention can be performed by using a plasma-spraying apparatus, a thermally treating electric furnace, etc. ordinarily employed. Therefore, as compared with EVD and CVD, the invention can be more easily technically worked at lower costs, while the treating speed and the treatable area can be increased. With respect to SOFCs having small output per cell unit, such a mass-producing technique is essential.

In the present invention, the term "electrically conductive film" includes both an electron-conductive film (particularly, interconnector) and an ion-conductive film (particularly, solid electrolyte).

The "spraying" encompassed by the present invention is directed to a technique in which a ceramic, a metal or a mixture thereof is fed into a gas flame or a plasma atmosphere or environment at a high temperature, and a film is formed by blowing the melted or semi-melted powdery ceramic, metal or mixture onto a substrate. The "spraying" includes flame spraying, plasma spraying and the like.

According to the current technique, when a solid electrolyte film is formed by plasma spraying, the permeability constant of nitrogen gas is about $5\times10^{-6}$ $cm^4/g.sec$ to cause leakage of much fuel. Further, it was confirmed that even if the permeability constant of nitrogen gas is around $10^{-7}$ $cm^4/g.sec$ but the thickness of the film is as much as about 100 µm, voltage at an open end becomes lower than 1 V.

In a preferred embodiment of the present invention, an interconnector and a solid electrolyte film are formed on the surface of an electrode. With respect to the gas-tight film composed of both these films, the average permeability constant of nitrogen gas of the gas-tight film is not more than $9 \times 10^{-8}$ cm$^4$/g.sec.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 5(a) is a front view illustrating a bottomed, tubular air electrode substrate, FIG. 5(b) being a front view illustrating the state that an interconnector is provided on the air electrode substrate, and FIG. 5(c) being a front view illustrating the state in which a solid electrolyte film is further provided;

FIG. 7 is a schematic view for illustrating the method for measuring the N$_2$ gas permeability constant.

DETAILED DESCRIPTION OF THE INVENTION

Figure 1:
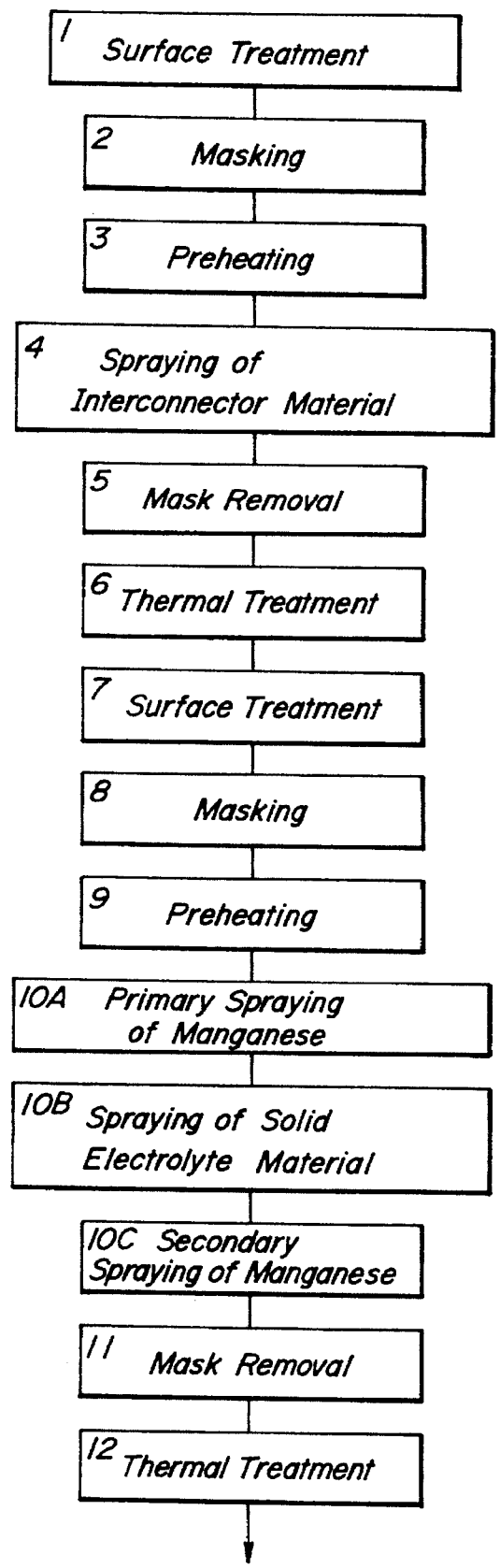
FIG. 1 is a flow chart for illustrating an embodiment of the producing process of the present invention.

When an interconnector is to be formed according to the present invention, a material for the formation of the interconnector is sprayed on the surface of the substrate to form a sprayed film, while the thickness of a sprayed film formed per one pass of the spraying gun is suppressed to not more than 10 μm, and then the sprayed film is thermally treated. The interconnector is preferably made of a composite oxide of a lanthanum base perovskite type, for example, lanthanum chromite. When the interconnector is made of lanthanum chromite, a material for the formation of the interconnector may be lanthanum chromite or a mixture of lanthanum oxide and chromium oxide. If copper, zinc, calcium, strontium or the like is doped into the material for the interconnector, densification of the interconnector is promoted during the post heat treatment.

Further, the present inventors have discovered that the above thermal treatment of the sprayed film not only promotes the densification of the interconnector, but also enhances adhesion of the interconnector to the substrate.

When the solid electrolyte film is to be formed according to the present invention, a solid electrolyte material is sprayed onto the substrate to form a sprayed film, while the thickness of a sprayed film formed per one pass of the spraying gun is suppressed to not more than 10 μm, and then the sprayed film is thermally treated.

Preferably, an intermediate layer is formed on the surface of the substrate by spraying a manganese compound, a sprayed film is formed on the surface of the intermediate layer by spraying a solid electrolyte material, and a gas-tight solid electrolyte film is formed by eliminating the intermediate layer through thermal treatment. That is, manganese moves and disperses from the intermediate layer to the sprayed film during the thermal treatment. As a result, manganese is solid solved in at least that region of the solid electrolyte film near the interface between the solid electrolyte film and the substrate. According to the inventors' research, the dispersed manganese functions to promote densification of the sprayed film during the thermal treatment. Further, the analysis of the solid electrolyte film with an EPMA revealed that the content of manganese near the interface between the substrate and the solid electrolyte film is high, and that region of the electrolyte film containing manganese has increased densification.

When a perovskite type composite oxide is used as the material for the substrate and the solid electrolyte film is formed from a fully stabilized or partially stabilized zirconia, a high resistant layer composed of electrically insulating lanthanum zirconate (La$_2$Zr$_2$O$_7$) is formed at the interface between the solid electrolyte film and the substrate by the thermal treatment at a temperature not less than about 1,250° C. In this case, it is discovered that when the above intermediate layer made of manganese is provided, the production of the lanthanum zirconate layer is remarkably restrained and almost no such layer is observed. As a result, the output of the cell unit can be further increased.

In the perovskite type composite oxide containing lanthanum, it is preferable that a part of A-sites occupied by lanthanum is replaced by strontium or calcium. As the zirconia solid electrolyte material, a mixture or a solid solution of a compound (particularly, an oxide) of a alkaline earth metal or a rare earth element and zirconia may be used.

In another preferred embodiment of the present invention, a surface layer is formed on the surface of the sprayed film by spraying a manganese compound, and a gas-tight solid electrolyte film is formed by eliminating the intermediate layer and the surface layer through the above thermal treatment.

In order to solid solve manganese into the solid electrolyte film, there are three other processes. According to a first process, manganese is incorporated into the solid electrolyte material. That is, a powdery manganese compound is added and mixed into a powdery solid electrolyte material, and the mixed powder is calcined to solid solve manganese into the solid electrolyte material. Then, a film of the solid electrolyte material into which manganese is solid solved is formed by spraying. Thereafter, a gas-tight solid electrolyte film is formed by thermally treating the sprayed film. A filmy fuel electrode is formed on the surface of the solid electrolyte film.

According to a second process, the solid electrolyte material is sprayed onto the surface of the substrate, the sprayed film is impregnated with a solution containing manganese compound, and the sprayed film is dried and thermally treated.

According to a third process, a powdery compound containing manganese and a solid electrolyte material are melted in a spraying gun. That is, the above powdery compound and the solid electrolyte material are fed into a spraying section of the spraying gun through respective powder feeders, and the melt inside the spraying section is sprayed onto the surface of the substrate.

The content of manganese in the solid electrolyte film is preferably 1 to 15 mol %, more preferably 3 to 12 mol %. In the present invention, the content of manganese is the content of manganese when the amount of all metal atoms in the solid electrolyte film is taken as 100 mol %.

In a further preferred embodiment of the present invention, the surface of the substrate is treated, a mask is placed on this surface, and the substrate is preheated.

Figure 2:
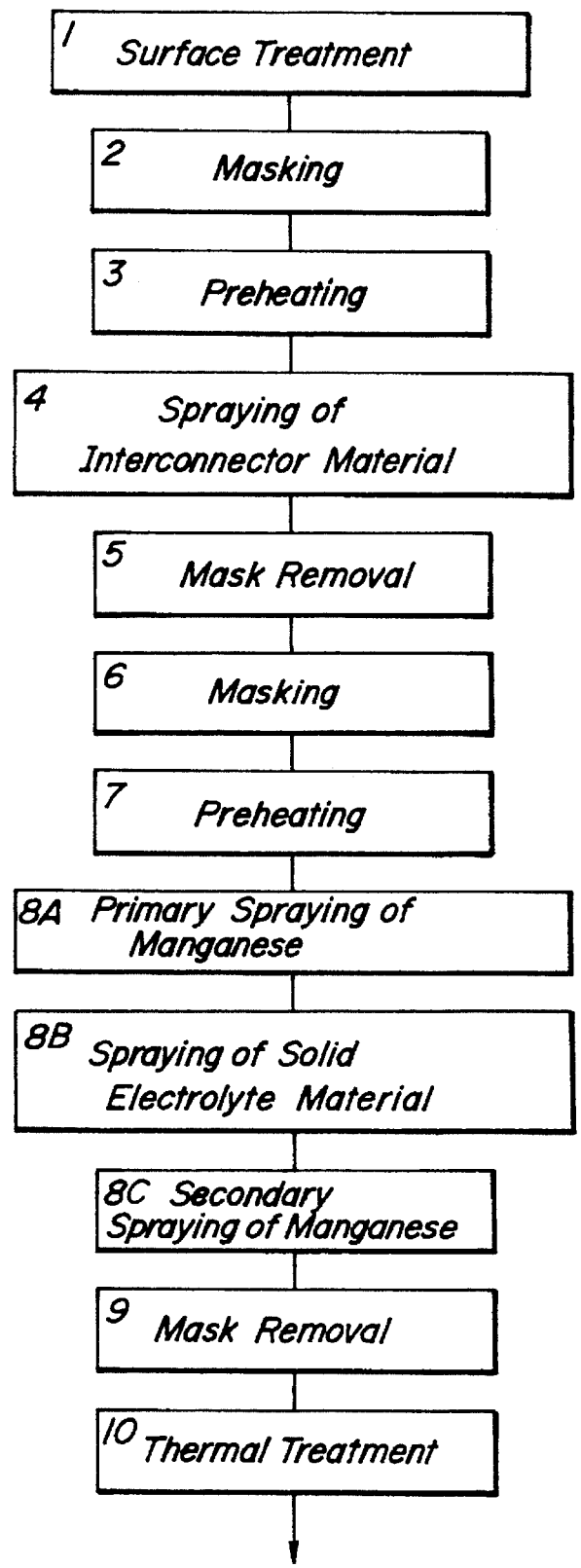
FIG. 2 is a flow chart for illustrating another embodiment of the producing process of the present invention.

Further, when an interconnector and a solid electrolyte film are both to be provided on the substrate according to the present invention, it is preferable to follow the steps of the flow chart shown in FIG. 1 or FIG. 2.

The steps shown in FIG. 1 will be explained as follows:
1) The surface of a substrate is treated (Surface Treatment).
2) A mask for the formation of an interconnector is placed on the substrate (Masking).
3) The substrate is preheated (Preheating).
4) A material for the formation of the interconnector is sprayed onto the substrate to form a first sprayed film (Spray Coating of Interconnector Material).
5) The interconnector-forming mask is removed from the substrate (Mask Removal).
6) The first sprayed film is thermally treated to form the interconnector (Thermal Treatment).
7) A surface of at least a portion of the substrate other than the interconnector is treated (Surface Treatment).
8) A mask for the formation of a solid electrolyte film is placed on the substrate (Masking).
9) The substrate is preheated (Preheating).
10) A solid electrolyte material is sprayed on the substrate to form a second sprayed film (Spray Coating).
11) The mask for the formation of the solid electrolyte film is removed from the substrate (Mask Removal).
12) The second sprayed film is thermally treated to form the solid electrolyte film (Thermal Treatment).

As shown in the steps of FIG. 1, it is preferable in the present invention that 10A) an intermediate layer is formed by spraying a manganese compound on the surface of the substrate (Primary Coating of Manganese), 10B) a sprayed film is formed by spraying zirconia powder stabilized with 8 mol yttria (8YSZ powder) onto the surface of the intermediate layer, and 10C) the manganese compound is sprayed onto the surface of the resulting sprayed film (Secondary spraying of Manganese).

The steps shown in FIG. 2 will be explained as follows:
1) The surface of the substrate is treated (Surface Treatment).
2) A mask for the formation of an interconnector is placed on the substrate (Masking).
3) The substrate is preheated (Preheating).
4) A material for the formation of the interconnector is sprayed onto the substrate to form a first sprayed film (Spray Coating of Interconnector Material).
5) The interconnector-forming mask is removed from the substrate (Mask Removal).
6) A mask for the formation of a solid electrolyte film is placed on the substrate (Masking).
7) The substrate is preheated (Preheating).
8) A solid electrolyte material is sprayed onto the substrate to form a second sprayed film (Spray Coating).
9) The solid electrolyte film-forming mask is removed from the substrate (Mask Removal).
10) The first and second sprayed films are simultaneously thermally treated.

As shown in the steps of FIG. 2, it is preferable in the present invention that 8A) an intermediate layer is formed on the surface of the substrate by spraying a manganese compound (Primary Coating of Manganese), 8B) a sprayed film is formed by spraying 8YSZ powder onto the surface of the intermediate layer, and 8C) the manganese compound is sprayed onto the surface of the resulting sprayed film to form a surface layer (Secondary spraying of Manganese).

According to the steps shown in FIG. 2, the first and second sprayed films are simultaneously densified by a single thermal treatment to form the interconnector and the solid electrolyte film both having gas-tightness. Therefore, the time and labor for production of the SOFC can be largely reduced.

In the present invention, instead of the steps in FIGS. 1 and 2, steps may be employed in which the solid electrolyte film is first formed, and then the interconnector is formed. In this case, the second sprayed film is formed and then the first sprayed film is formed.

When an air electrode of a self-supporting type is employed as a substrate, the producing process can be simplified as compared with a case where an air electrode film is formed on the surface of a support. Further, the present invention is also applicable to a case where a self-supporting type fuel electrode is employed as a substrate.

Further, the present invention is applicable to planar SOFCs, tubular SOFCs, and any other type SOFCs for which spraying can be used. However, the invention is particularly suitably employed for tubular SOFCs.

Figure 3:
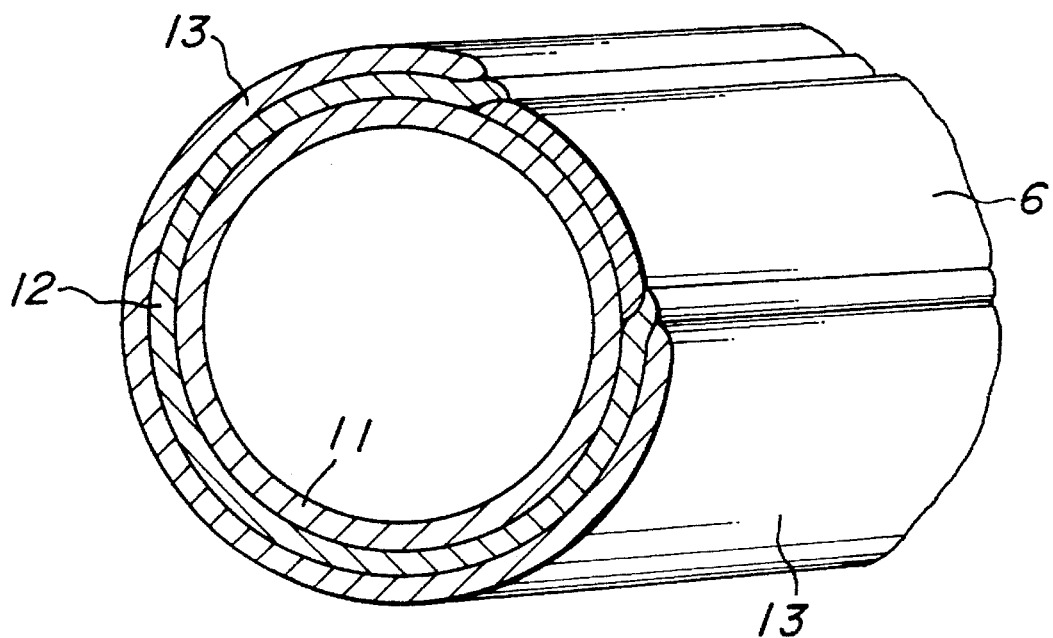
FIG. 3 is a cut perspective view illustrating an end of a tubular SOFC.
Figure 4:
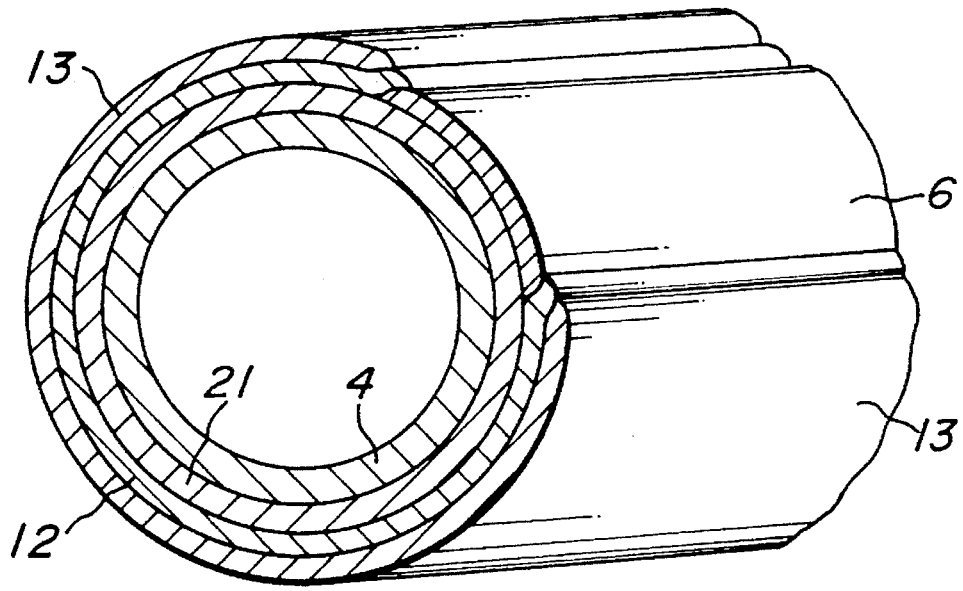
FIG. 4 is a cut perspective view illustrating an end of another tubular SOFC.

When the present invention is applied to a tubular SOFC, the SOFC may be designed in a tubular shape with opposite ends opened or with one end opened and the other closed. FIGS. 3 and 4 are perspective views of such tubular SOFCs near open ends. In each of FIGS. 3 and 4, the SOFC is shown only in the vicinity of an open end. The other end may be opened or closed. Alternatively, a space inside the tubular SOFC may be sealed by the provision of bottoms.

In FIG. 3, a solid electrolyte film 12 and a fuel electrode film 13 are provided on an outer surface of a single-layer tubular air electrode 11 serving as a substrate and made of an air electrode material. In FIG. 3, an interconnector 6 is provided on a surface of the air electrode substrate 11 in an upper area, and connection terminals are to be attached onto the interconnector. In order to connect tubular SOFCs in series, the air electrode substrate 11 of the SOFC is connected to a fuel electrode film 13 of an adjacent SOFC by the interconnector 6 and a connecting terminal. In order to connect tubular SOFCs in parallel, fuel electrode films 13 of adjacent SOFC elements are connected together with an Ni felt or the like. The solid electrolyte film 12 and the interconnector 6 are provided according to the present invention.

In the SOFC of FIG. 4, an air electrode film 21 is provided on an outer surface of the tubular porous ceramic substrate 4, and a solid electrolyte film 12 and an interconnector 6 are provided on the outer surface of the air electrode film 21. A fuel electrode film 13 is formed on the outer surface of the solid electrolyte film 12.

Next, an embodiment in which a bottom portion is sealingly provided at one end of a tubular SOFC will be explained with reference to FIGS. 5(a) through 5(c). As shown in FIG. 5(a), an air electrode substrate 11A is prepared. In this embodiment, the air electrode substrate 11A is constituted by a tubular portion 11a and a semi-spherical bottom portion 11b. Depending upon a way for preparing the air electrode substrate, there may be a seam or a joint formed between the tubular portion 11a and the bottom portion 11b. Then, as shown in FIG. 5(b), an interconnector 6 is provided in a tape-like form on a surface of the tubular portion 11a. Thereafter, as shown in FIG. 5(c), a solid electrolyte film 12 is formed on a portion of the outer peripheral portion of the air electrode substrate, excluding the interconnector 6. In such a bottomed tubular SOFC, a area in which the interconnector 6 exists functions as a main power-generating area A.

As a method for treating the surface of the substrate, it is preferable to make coarse the surface of the substrate with a grinding stone or a sandpaper. When the sprayed film is thermally treated according to the present invention, the sprayed film may be shrunk in this stage so that the electrically conductive film may be peeled from the substrate after the thermal treatment. However, it was proved that when the surface of the substrate is made coarse as mentioned above, the sprayed film will not be peeled from the substrate even by the thermal treatment.

In a preferred embodiment of the present invention, the substrate is preliminarily heated at a temperature not lower than 120° C. By so doing, it becomes unlikely that the substrate is cracked or cut during the spraying step. It is considered that this is because water absorbed in the substrate is removed by preliminarily heating the substrate, and difference in temperature between the substrate and the molten material becomes smaller. The preheating temperature is more preferably 120° C. to 250° C.

It was discovered that a glass cloth tape impregnated with Teflon is particularly preferably used as the above mask. That is, although some heat-resistant tapes made of Teflon or a metallic foil have been known, it often happened that the heat-resistive tape was peeled from the substrate during the spraying in the case of a plasma spraying apparatus having a high output of about 40 kw. In the case that the Teflon-impregnated glass cloth tape and a silicon base adhesive are used in combination, such peeling from the substrate will not occur.

When a material for the formation of the electrically conductive film is sprayed onto the substrate, it is preferable that the moving speed of the spraying gun is 400 mm/sec. to 800 mm/sec. when the substrate is not rotated, and that the moving speed is 50 mm/sec. to 200 mm/sec. when the substrate is rotated. When the substrate is tubular, it is preferable to spray coat the substrate, while the substrate is being rotated 500 rpm to 1000 rpm. It is conventionally known to form the solid electrolyte film of the SOFC by plasma spraying. In this case, the tubular substrate has been rotated at about 400 rpm. However, there was the possibility that the tubular substrate was cracked at this rotating speed.

To the contrary, when the tubular substrate is sprayed under the rotation of 500 rpm to 1000 rpm, it becomes unlikely that the substrate is cracked. Consequently, the yield at the time of spraying is improved. Further, since the number of laminations of the sprayed films on the substrate can be increased, both uniformity and densification of the sprayed film can be promoted, and variation in thickness of the sprayed film will not occur.

It was confirmed that when the substrate is sprayed under cooling, it has an effect to prevent the substrate from being cracked. As the cooling method, air cooling is preferred.

As shown in FIGS. 5(a) through 5(c), when the substrate is of a tubular bottomed shape, the following spraying is preferred, which will be explained with reference to the embodiment shown in FIGS. 5(a) through 5(c).

In the air electrode substrate 11A of FIG. 5(a), there is the joint portion 11c between the tubular portion 11a and the bottom portion 11b. The air electrode substrate 11A is sprayed successively from an open end side to the bottom portion 11b. Assume that the distance between the tubular portion 11a and the spraying gun is taken as 1 when the tubular portion is being sprayed. Immediately before the surface of the joint portion 11c is sprayed, the spraying gun is spaced away from the substrate 11A so that the distance between the joint portion 11c and the spraying gun may be not less than 1.31 (preferably not less than 1.51).

That is, it was confirmed that if the tubular portion 11a and the bottom portion 11b of the substrate are sprayed at the same spraying distance, the substrate 11A is cracked in the vicinity of the joint portion 11c.

On the other hand, if the distance between the substrate 11A and the spraying gun is too long, the above cracking will not occur, but the gas-tightness of the sprayed film after the thermal treatment is deteriorated. When the distance between the tubular portion and the sprayed gun is taken as 1 and then the distance between the joint portion 11c and the spraying gun is set at not less than 1.3, the thin film having high gas-tightness can be formed on the power-generating area. Further, the spraying distance is set greater on the area which does not largely contribute to the power generation, so that the substrate 11A is prevented from being cracked.

Further, it is preferable to set the thermal treatment temperature of the sprayed film at 1300° C. to 1600° C. If the temperature is less than 1300° C., the sprayed film is unlikely to be densified, whereas if the temperature is more than 1600° C., sintering of the substrate proceeds.

In the following, concrete test examples will be described.

Figure 6:
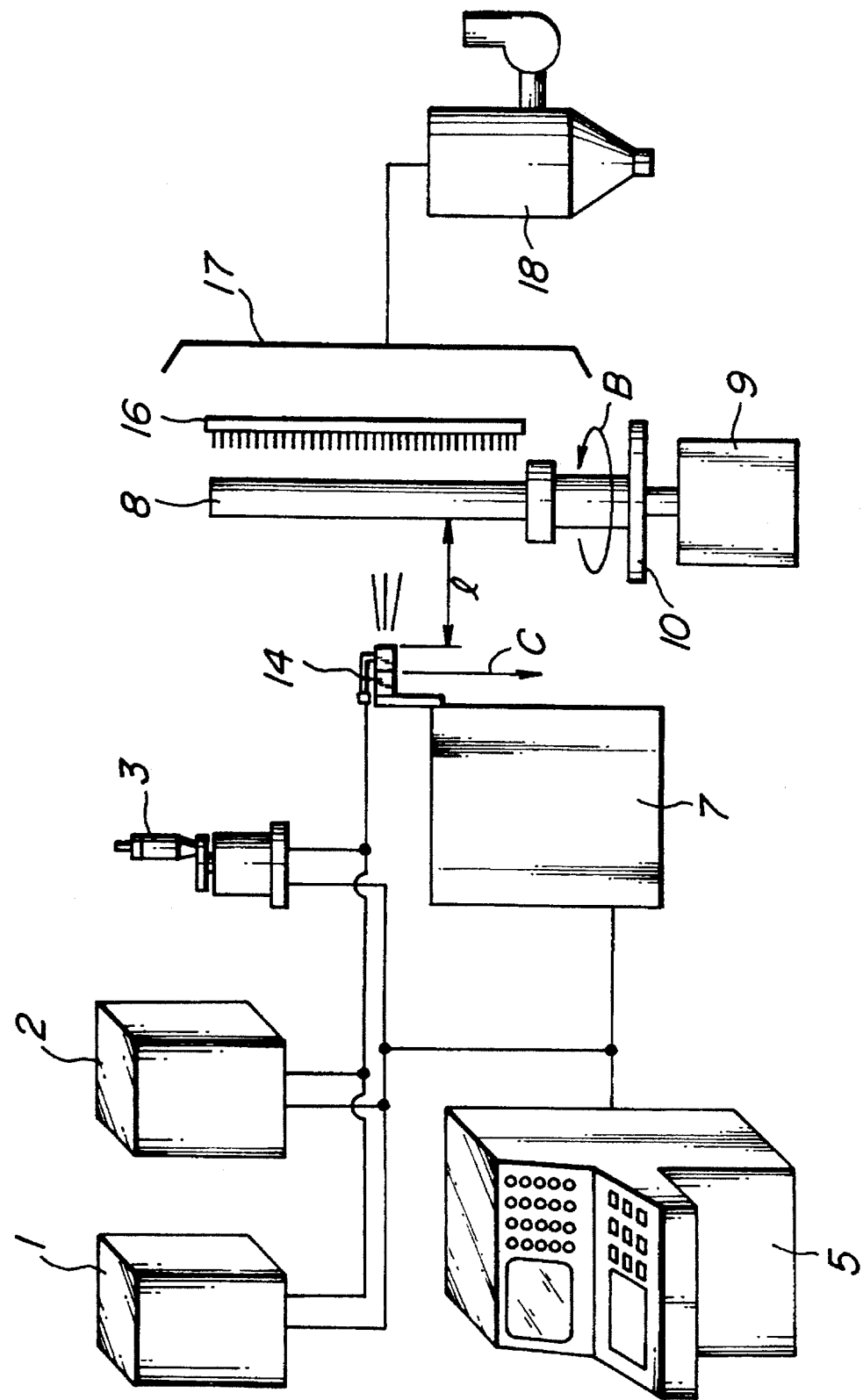
FIG. 6 is a view for diagrammatically illustrating a plasma-spraying apparatus.

In the following test examples, a plasma spraying apparatus shown schematically in FIG. 6 was used. In FIG. 6, electric power was supplied from a plasma electric power source 1, and a gas control unit 2, a powder feeder 3 and a robot 7 were controlled by a controller 5. A given spraying powder is fed to a spraying gun 14 from the powder feeder 3, and the spraying gun 14 is moved at a given speed in a direction of an arrow C by means of the robot 7. A turn table 10 is attached onto a driving unit 9, and a tubular air electrode 8 also serving as a substrate is fixed onto the turn table 10. The turn table 10 is rotated in a direction of an arrow B during spraying. If necessary, compressed air is ejected toward the air electrode substrate 8 through a cooling nozzle 16. A hood 17 is arranged on a side opposite to the spraying gun 14 through the substrate so that dust impinging upon the hood 17 might be collected by a dust collector 18.

EXPERIMENT 1

An example in which a film of an interconnector was formed will be described.

A raw material of lanthanum manganite ($La_{0.9}Sr_{0.1}MnO_3$) is molded by rubber press process, thereby obtaining a tubular molding having an outer diameter of 24 mm, an inner diameter of 17 mm and a length of 300 mm. The molding was worked to reduce the outer diameter to 23 mm. The resulting tubular molding was fired at 1500° C. in air for 5 hours, thereby obtaining a tubular substrate made of porous lanthanum manganite having a porosity of 20%. A film of an interconnector was formed on this tubular substrate under conditions shown in Table 1.

The resulting samples were surface-treated or not surface-treated as shown in Table 1. "Surface-treated" means that the outer surface of the tubular substrate was ground with use of a diamond grinding stone #400 to reduce the outer diameter to 20 mm. The tubular substrate was washed with water in an ultrasonic wave washer, and dried in a dryer at 110° C.

for 5 hours. Next, the tubular substrate was cooled, and masked with a mask made of a Teflon-impregnated glass cloth tape coated with a silicone base adhesive, excluding an area in which an interconnector having a width of 10 mm and a length of 200 mm was to be formed. The samples were preheated or not preheated as shown in Table 1. "Preheated" means that the sample was placed in a dryer, and preheated at 120° C. for 30 minutes. Next, a film of the interconnector was formed by using the plasma spraying apparatus shown in FIG. 6. As a spraying raw material, a raw material of lanthanum chromite ($La_{0.9}Sr_{0.1}CrO_3$) granulated at the average particle diameter of 60 μm by a spray dryer was used.

The plasma spraying was effected, while plasma spraying conditions were set as shown in Table 1. Next, after a heat-resistant tape was peeled from each of the tubular substrates, each sample was charged into an electric furnace where the sample was thermally treated at 1,500° C. in air for 3 hours. With respect to each sample, the yield (%), the masked state and adhesion to the interconnector of the tubular substrate in the spraying step were examined, and results are shown in Table 1.

In the same manner as stated above, interconnector films shown in Table 1 were formed. In this case, each substrate was not masked at all, and an interconnector was formed on the entire surface of the substrate. The resulting interconnector-formed substrates were used for the measurement of the $N_2$ gas permeability coefficient of each sample. Results are also shown in Table 1.

The interior face of the sample 25 was exposed to a pressurized nitrogen atmosphere at 2 atms, whereas the exterior face of the sample was exposed to open air at ordinary pressure (Measurement was effected at room temperature). At that time, a flow rate of the nitrogen gas flowing from the 2-atms side to the 1-atm side was measured by a mass controller 23, and the $N_2$ gas permeability coefficient [$K(cm^4g^{-1}sec^{-1})$] was determined by the following equation. In FIG. 7, 22 is an $N_2$ bomb, 26 a pressure gauge, and 27 a valve.

$$K = t \cdot Q/\Delta P \cdot A$$

in which t: thickness of sample (cm)
Q: flow rate of permeated $N_2$ gas(1 sec)
ΔP: pressure difference (g/cm$^2$)
A: surface area of sample 25

At that time, an air electrode substrate was independently set as a sample 25, and the $N_2$ gas permeability coefficient $K_1$ thereof was measured. Further, a laminate of an air electrode and an interconnector was set, and its $N_2$ gas permeability coefficient $K_3$ was measured. The $N_2$ gas permeability coefficient $K_2$ of the interconnector alone was calculated according to the following equation.

$$K_2 = t_2 \cdot K_1 \cdot K_3/(K_1 \cdot t_3 - t_1 \cdot K_3)$$

in which

TABLE 1

| Steps | Example 1-1 | Example 1-2 | Comparative Example 1-1 | Example 1-3 | Example 1-4 | Example 1-5 | Example 1-6 | Example 1-7 | Comparative Example 1-2 |
|---|---|---|---|---|---|---|---|---|---|
| Surface treatment | surface-treated | surface-treated | not surface-treated | surface-treated | surface-treated | not surface-treated | not surface-treated | surface-treated | not surface-treated |
| Preheating | preheated | preheated | preheated | preheated | preheated | not preheated | preheated | preheated | not preheated |
| spraying | | | | | | | | | |
| output (kw) | 35 | 35 | 35 | 33 | 30 | 38 | 33 | 33 | 35 |
| number of revolutions (rpm) | 800 | 800 | 800 | 950 | 900 | 900 | 600 | 600 | 400 |
| moving speed of spraying gun (mm/sec) | 100 | 100 | 100 | 70 | 150 | 100 | 100 | 100 | 30 |
| spraying distance (mm) | 120 | 120 | 120 | 110 | 140 | 120 | 140 | 140 | 120 |
| cooling of substrate | cooled | cooled | cooled | cooled | cooled | cooled | cooled | not cooled | not cooled |
| feed rate of raw material powder (g/min) | 10 | 30 | 50 | 20 | 8 | 15 | 30 | 30 | 30 |
| thickness of laminate (μm) | 100 | 120 | 120 | 120 | 100 | 120 | 100 | 100 | 100 |
| thickness of film formed per one pass (μm) | 3 | 7 | 12 | 5 | 2 | 4 | 7 | 8 | 15 |
| yield of substrate (%) | 100 | 100 | 80 | 100 | 100 | 60 | 100 | 40 | 20 |
| masked state | ○ | ○ | ○ | ○ | ○ | ○ | ○ | Δ | x |
| Thermal treatment | thermally treated | thermally treated | thermally treated | thermally treated | thermally treated | thermally treated | thermally treated | thermally treated | not thermally treated |
| Characteristics | | | | | | | | | |
| $N_2$ gas permeability coefficient ($\times 10^{-8}$ cm$^4$/g · sec) | 0.05 | 9 | 20 | 5 | 0.3 | 0.7 | 9 | 8 | 300 |
| adhesion of interconnector | ○ | ○ | Δ | ○ | ○ | Δ | Δ | ○ | x |

The $N_2$ gas permeability coefficient was measured by using an apparatus shown schematically in FIG. 7. That is, a tubular sample 25 was set to jigs 24, and the sample 25 was sealingly bonded to the jig 24 with an adhesive.

$t_2$: thickness of interconnector
$t_3$: thickness of laminate
$t_1$: thickness of air electrode substrate The following are seen from Table 1.

First, the adhesion between the substrate and the interconnector is improved by treating the surface of the substrate. In Table 1, ○ means good adhesion of interconnector, Δ means partially poor adhesion of interconnector, and X means poor adhesion of the interconnector.

Any one of preheating the tubular substrate, cooling of the substrate and the rotation of the substrate at not less than 500 rpm on plasma spraying is effective for the prevention of the substrate from being cracking, resulting in improved yield of the substrate.

Further, it was confirmed that when the thickness of the sprayed film formed per one pass of the spraying gun is suppressed to not more than 10 μm, the $N_2$ gas permeability coefficient is not more than $9 \times 10^{-8}$ cm$^4$/g.sec. In particular, it was discovered that when the thickness of the sprayed film is suppressed to not more than 5 μm, the $N_2$ gas permeability coefficient is not more than $5 \times 10^{-8}$ cm$^4$/g.sec. More particularly, when the spraying conditions that the number of revolutions of the substrate is not less than 600 rpm, the moving speed of the spraying gun is not less than 70 mm/sec and the thickness of a layer laminated per one pass of the spraying gun is not more than 10 μm (the spraying distance, the raw material powder feed rate, and the output) is selected, the $N_2$ gas permeability coefficient is improved and the densification of the film can be increased.

When the tubular substrate was sprayed, while being not cooled, the masked state was partially poor (Δ) or entirely poor (X) after the spraying.

EXPERIMENT 2

Samples in which a film of a solid electrolyte was formed will be explained below.

A band-like interconnector having a width of 10 mm and a length of 200 mm was formed on a surface of a tubular substrate in the same manner as in Example 1-1 of Experiment 1. A plurality of samples were prepared, and a solid electrolyte film was formed on each sample in the following manner under conditions given in Table 2. Zirconia stabilized with 8 mol yttria (8YSZ powder) having the average particle diameter of 20 μm was prepared as a solid electrolyte material. The samples were surface-treated or not surface-treated as shown in Table 2. "Surface-treated" means that the outer surface of the substrate other than the interconnector was ground with a #400 sand paper. Next, the tubular substrate was washed with water, and dried at 120° C. The dried tubular substrate was cooled, and a mask having a width of 6 mm and a length of 196 mm was uniformly bonded to the surface of a portion of the substrate corresponding to the interconnector. As a material for the mask, a glass cloth impregnated with Teflon was used, and a silicone base adhesive was used as an adhesive for this heat-resistant tape.

The samples were then preheated or not preheated as shown in Table 2. "Preheated" means that the tubular substrate was placed into the dryer, and preheated at 150° C. for 30 minutes. Then, with respect to the sample provided with "intermediate layer", an intermediate layer was formed by spraying a manganese dioxide powder by means of the plasma spraying apparatus. Thereafter, a sprayed film was formed by plasma spraying the 8YSZ powder under the conditions shown in Table 2. In this stage, the yield of the substrate and the masked state were examined. Further, with respect to samples with surface layers, the surface layer was formed by spraying manganese dioxide by using the plasma spraying apparatus shown in FIG. 6. The sprayed amount of manganese dioxide was 1–3 mg/cm$^2$ with an output of 25 kw in each of the intermediate layer and the surface layer (the primary Mn spraying and the secondary Mn spraying coating).

Next, the mask was peeled from the tubular substrate, the sample was placed into the electric furnace, and was thermally treated at a temperature shown in Table 2 for 3 hours. With respect to the resulting samples, adhesion of the solid electrolyte film was examined.

Further, with respect to the tubular substrates used in Experiment 1, such a solid electrolyte film was formed as mentioned above without the provision of the interconnector. The solid electrolyte film was formed over the entire outer peripheral surface of the tubular substrate. Then, the $N_2$ gas permeability coefficient of each of the solid electrolyte films was measured according to the measuring method mentioned in connection with Experiment 1. Results are shown in Table 2.

TABLE 2

| Steps | Example 2-1 | Example 2-2 | Example 2-3 | Example 2-4 | Comparative Example 2-1 | Comparative Example 2-2 |
| --- | --- | --- | --- | --- | --- | --- |
| Surface treatment | surface-treated | surface-treated | surface-treated | surface-treated | not surface-treated | not surface-treated |
| Preheating | preheated | preheated | preheated | preheated | preheated | not preheated |
| Primary Mn-spraying (Interface layer) | provided | provided | provided | provided | not provided | not provided |
| Spraying of 8YSZ | | | | | | |
| output (kw) | 40 | 45 | 45 | 40 | 40 | 40 |
| number of revolutions (rpm) | 750 | 600 | 850 | 950 | 400 | 400 |
| moving speed of spraying gun (mm/sec) | 100 | 75 | 120 | 150 | 30 | 30 |
| spraying distance (mm) | 120 | 140 | 140 | 100 | 140 | 110 |
| cooling of substrate | cooled | cooled | cooled | cooled | cooled | not cooled |
| feed rate of raw material powder (g/min) | 15 | 30 | 20 | 5 | 30 | 30 |
| thickness of laminate (μm) | 100 | 100 | 100 | 70 | 100 | 100 |
| thickness of film formed per one pass (μm) | 4 | 10 | 7 | 1.4 | 12 | 14 |
| yield of substrate (%) | 100 | 80 | 80 | 100 | 100 | 20 |
| masked state | ○ | ○ | ○ | ○ | ○ | x |
| Secondary Mn-spraying (Surface layer) | provided | not provided | not provided | provided | not provided | not provided |
| Thermal treatment: thermal treatment temp. (°C.) | 1450 | 1400 | 1450 | 1450 | 1550 | not thermally treated |

TABLE 2-continued

| Steps | Example 2-1 | Example 2-2 | Example 2-3 | Example 2-4 | Comparative Example 2-1 | Comparative Example 2-2 |
|---|---|---|---|---|---|---|
| Characteristics | | | | | | |
| $N_2$ gas permeability coefficient ($\times 10^{-8}$ cm$^4$/g · sec) | 0.3 | 7 | 5 | 0.02 | 17 | 500 |
| adhesion of solid electrolyte film | ○ | ○ | ○ | ○ | Δ | x |

The following are seen from Table 2.

First, adhesion between the substrate and the solid electrolyte after the thermal treatment is improved by treating the surface of the substrate. Further, when the substrate is not preheated or cooled, many substrates were cracked or cut, so that the yield of the substrates in the spraying step decreased to 20%.

It is seen that the $N_2$ gas permeability coefficient is suppressed to not more than $9 \times 10^{-8}$ cm$^4$/g.sec when the thickness of a film formed per one pass of the spraying gun is controlled to not more than 10 μm. Particularly, it is seen that when the thickness of the sprayed film is not more than 5 μm, the $N_2$ gas permeability coefficient is not more than $1 \times 10^{-8}$ cm$^4$/g.sec.

EXPERIMENT 3

A case where a first sprayed film and a second sprayed film are formed and a gas-tight interconnector and a gas-tight solid electrolyte film are simultaneously formed by thermal treatment at one time will be explained.

A tubular molding having an outer diameter of 24 mm, an inner diameter of 17 mm and a length of 300 mm was produced by using powdery lanthanum manganite ($La_{0.9}Sr_{0.1}MnO_3$) by means of a rubber press process. The tubular molding was fired at 1480° C. in air for 5 hours, thereby obtaining a porous tubular substrate having a porosity of 23%.

Then, after the outer surface of the tubular substrate was made coarse by using a #200 sandpaper, the substrate was washed with water and dried. The substrate was then masked with a heat-resistive tape composed of a Teflon-impregnated glass cloth and a silicone based adhesive, excluding a portion of the substrate (a width: 10 mm and a length: 200 mm) where the interconnector is to be placed. The resulting substrate was placed in the dryer, and was preheated at 160° C. for 30 minutes. A first sprayed film was formed by using the plasma spraying apparatus.

A spraying material was prepared having an average particle diameter of 50 μm by granulating a raw material of lanthanum manganite ($La_{0.9}Ca_{0.1}CrO_3$) having the average particle diameter of 3 μm to 50 μm by means of spray dryer. The spraying conditions were set as follows: output 32 kw; number of revolutions of the tubular substrate 800 rpm; the moving speed of the spraying gun 120 mm/sec; the spraying distance 120 mm, the feed rate of the raw material 15 g/min.; the thickness of the laminate 140 μm; and the thickness of a sprayed film formed per one pass of the spraying gun 3 μm. As a result, the tubular substrate was not cracked, and the masked state after the spraying was good.

Next, a film of a solid electrolyte was formed. In order to partially mask the interconnecting portion having a width of 10 mm and a length of 200 mm, a heat-resistive tape was bonded to the surface of the interconnector. The heat-resistive tape included a Teflon-impregnated glass cloth having a thickness of 0.3 mm, a width of 6 mm and a length of 196 mm and a silicone base adhesive applied to the cloth. This tubular substrate was placed in the dryer, and preheated at 160° C. for 30 minutes.

The preheated tubular substrate was set on the turn table, and powdery manganese dioxide was sprayed three times at an output of 25 kw. Succeedingly, powdery zirconia stabilized with 8 mol yttria (8YSZ) was sprayed at an output of 40 kw, and a sprayed film having a thickness of 140 μm was obtained by passing the spraying gun forty times. At that time, the number of revolutions of the tubular substrate was 800 rpm, the moving speed of the spraying gun was 120 mm/sec, the spraying distance was 120 mm, and the supply rate of the raw material powder was 15 g/min. Thereafter, a surface layer was formed on the surface of the sprayed layer by feeding powdery manganese dioxide and spraying it three times at an output of 25 kw with the spraying conditions being varied. After the plasma spraying, the heat-resistive tape was peeled from the substrate. It was observed that the masked state was good.

Next, the sprayed substrate was thermally treated at 1450° C. for 3 hours in an electric furnace. Then, the $N_2$ gas permeability coefficient of each of the solid electrolyte film and the interconnector was measured to be $3 \times 10^{-8}$ cm$^4$/g.sec. Thus, it was found out that the solid electrolyte film and the interconnector had excellent gas tightness. In this measurement, the thickness of a portion where the interconnector overlapped with a solid electrolyte film was considered to be 140 μm.

EXPERIMENT 4

An interconnector and a solid electrolyte film were formed on the outer surface of a tubular air electrode substrate in the same manner as mentioned above according to Examples 2-1 through 2-4 and Comparative Examples 2-1 and 2-2 given in Experiment 2. Then, with respect to each laminate, a fuel electrode film was formed on the surface of the solid electrolyte film. At that time, the fuel electrode film was more specifically formed as follows. That is, a slurry containing nickel oxide and 8YSZ at 8:2 by weight ratio was coated onto the surface of the solid electrolyte film, the coated layer was dried, the laminated body was placed into the electric furnace, and the fuel electrode was formed by firing the dried laminate at 1300° C. for 1 hour. Pure oxygen was introduced as an oxidizing gas, whereas hydrogen wetted at room temperature was introduced as a fuel gas. A cell unit was actuated at 1000° C., and an electromotive force (voltage at open ends) was measured. Results are shown in Table 3.

TABLE 3

|  | Example 2-1 | Example 2-2 | Example 2-3 | Example 2-4 | Comparative Example 2-1 | Comparative Example 2-2 |
|---|---|---|---|---|---|---|
| Electromotive force (V) | 1.11 | 1.10 | 1.11 | 1.11 | 0.94 | 0.75 |

As is seen from Tables 2 and 3, when the $N_2$ gas permeability coefficient is raised to such a gas tightness of not more than $10^{-8}$ cm$^4$/g.sec, the electromotive force approaches an almost theoretical value. Further, when the $N_2$ gas permeability coefficient is raised to not more than $10^{-8}$ cm$^4$/g.sec, the electromotive force reaches 1.11 V.

EXPERIMENT 5

Experiment was effected to look for a heat-resistive masking material suitable for the plasma spraying.

A planar substrate having a porosity of 20% and a size of 30 mm×50 mm×1 mm and made of nickel-zirconia cermet was prepared. A heat-resistive tape was bonded to a main surface of this planar substrate to mask a rectangular portion having a width of 10 mm and a length of 50 mm. Then, 8YSZ was laminated upon the planar substrate in a thickness of 100 μm by using the plasma spraying apparatus. At the time of this spraying, a mixed gas of argon and hydrogen was used as a plasma gas, the output was 38 kw, the distance between the planar substrate and the spraying gun was set at 140 mm, the moving speed of the spraying gun was set at 600 mm, and the feed rate of the powder was 30 g/min.

A substrate of the heat-resistive tape and an adhesive of the heat-resistive tape were varied as shown in Table 4. After the above plasma spraying, the masked state was examined. Results are shown in Table 4.

TABLE 4

| Substrate of heat-resistive tape | Adhesive for tape | Masked state |
|---|---|---|
| Glass cloth | Silicone base | partially peeled |
| Epoxy-impregnated tetron cloth | Acrylic base | peeled |
| Teflon | Silicone base | partially peeled |
| Stainless steel | Acrylic base | peeled |
| Aluminium | Acrylic base | peeled |
| Teflon-impregnated glass cloth | Silicone base | not peeled |

As is seen from Table 4, when the Teflon-impregnated glass cloth is used as the substrate for the heat-resistive tape and the silicone base adhesive is used, the heat-resistive tape is not peeled and masking can be made in a desired shape. On the other hand, in the case of combination of the other substrate and adhesive, the masked state was poor and the heat-resistive tape was entirely or partially peeled in the course of spraying, so that the masking was not made in the intended shape.

EXPERIMENT 6

A porous tubular substrate having an outer diameter of 12 mm, a length of 300 mm and a thickness of 1.2 mm was prepared. As shown in Table 5, $La_{0.9}Sr_{0.1}MnO_3$ or zirconia stabilized with calcium was used as a material for the tubular substrate. Each substrate was chucked on a turn table, and plasma spraying was effected by feeding 8YSZ with use of the plasma spraying apparatus shown in FIG. 6 under rotation of 600 rpm. The plasma spraying conditions were an output of 40 kw and a moving speed of the spaying gun of 100 mm/sec.

As shown in Table 5, the samples were preheated or not preheated. "Preheated" means that the tubular substrate was preheated at 150° C. "Cooled" in Table 5 means that the tubular substrate was cooled with air under compressor pressure of 5 kg/cm$^2$ during spraying. With respect to the samples, tubular substrates free from occurrence of cracks were judged to be acceptable, and their yields were examined. Results are shown in Table 5.

TABLE 5

| | Material of cylindrical substrate | Presence of bottom portion in cylindrical substrate | Preheated | Cooling of substrate during spray coating | Spray coating distance (mm) bottom portion & joint portion | Spray coating distance (mm) cylindrical portion | Yield of substrate |
|---|---|---|---|---|---|---|---|
| 6-1 | $La_{0.9}Sr_{0.1}MnO_3$ | not present | not preheated | not cooled | — | 110 | 20 |
| 6-2 | Ca-stabilized zirconia | not present | preheated | not cooled | — | 110 | 40 |
| 6-3 | $La_{0.9}Sr_{0.1}MnO_3$ | not present | not preheated | cooled | — | 110 | 80 |

TABLE 5-continued

|  | Material of cylindrical substrate | Presence of bottom portion in cylindrical substrate | Preheated | Cooling of substrate during spray coating | Spray coating distance (mm) | | Yield of substrate |
|---|---|---|---|---|---|---|---|
|  |  |  |  |  | bottom portion & joint portion | cylindrical portion |  |
| 6-4 | $La_{0.9}Sr_{0.1}MnO_3$ | not present | preheated | not cooled | — | 110 | 60 |
| 6-5 | $La_{0.9}Sr_{0.1}MnO_3$ | not present | preheated | cooled | — | 110 | 100 |
| 6-6 | $La_{0.9}Sr_{0.1}MnO_3$ | present | preheated | cooled | 110 | 110 | 0 |
| 6-7 | $La_{0.9}Sr_{0.1}MnO_3$ | present | preheated | cooled | 130 | 110 | 40 |
| 6-8 | $La_{0.9}Sr_{0.1}MnO_3$ | present | preheated | cooled | 150 | 110 | 100 |

As is seen from Table 5, when the substrate was preheated or cooled, the yield of the substrate in the spraying was far high. Particularly, Example 6-5 in which the substrate underwent both preheating and cooling (no bottom portion) were free from cracking of the substrate.

However, when a bottom portion was provided as shown in FIG. 5, Example 6-6 having undergone preheating and cooling was cracked at a joint portion between the bottom portion and a tubular portion. Thus, the spraying distance was changed to 130 mm or 150 mm, 10 mm before the joint portion (Examples 6-7 and 6-8). As a result, a considerable effect was observed even in Example 6-7, and particularly the yield of the substrate in the spraying step was 100% in Example 6-8 in which the spraying distance was set at 150 mm.

As mentioned above, according to the present invention, the electrically conductive film having extremely high gas-tightness can be mass produced by using a spraying plant and an electric furnace ordinarily used. Therefore, the production amount of the SOFCs can be increased to lower the production cost. Further, the thickness of the electrically conductive film can be made thinner, the inner resistance of the cell unit can be lowered, and the electromotive forces can be increased.

What is claimed is:

1. A process for producing a solid oxide fuel cell, comprising the steps of:

providing a substrate;

treating a surface of said substrate;

placing a mask on said substrate;

preheating said substrate;

forming a sprayed film on said substrate by spraying a material for the formation of an electrically conductive film, while a thickness of a sprayed film formed per one pass of a spraying gun is suppressed to not more than 10 μm;

removing said mask from said substrate; and forming said electrically conductive film by thermally treating said sprayed film.

2. The process according to claim 1, wherein said sprayed film is formed by spraying a material for the formation of an interconnector onto a surface of the substrate, and then said interconnector is formed by thermally treating said sprayed film.

3. The process according to claim 1, wherein said sprayed film is formed by spraying a solid electrolyte material onto a surface of the substrate, and then forming solid electrolyte film by thermally treating said sprayed film.

4. The process according to claim 3, wherein an intermediate layer is formed onto the surface of the substrate by spraying of manganese or an oxide of manganese, a sprayed film is formed onto a surface of said intermediate layer by spraying said solid electrolyte material, and a gas-tight solid electrolyte film is formed by diminishing said intermediate layer through said thermal treatment.

5. The process according to claim 4, wherein a surface layer is formed on a surface of said sprayed film by spraying the manganese or an oxide of manganese, and said gas-tight solid electrolyte film is formed by diminishing said intermediate layer and the surface layer through said thermal treatment.

6. A process for producing a solid oxide fuel cell, comprising the steps of:

providing a substrate;

treating the surface of said substrate;

placing a first mask for the formation of an interconnector onto the substrate;

preheating said substrate;

forming a first sprayed film onto the substrate by spraying a material for the formation of the interconnector, while a thickness of a sprayed film formed per one pass of a spraying gun is suppressed to not more than 10 μm;

removing said first mask from the substrate;

forming said interconnector by thermally treating the first sprayed film;

treating a surface of at least a portion of the substrate other than a portion corresponding to said interconnector;

placing a second mask for the formation of a solid electrolyte film onto the substrate;

preheating said substrate;

forming a second sprayed film onto the substrate by spraying a solid electrolyte material, while a thickness of a sprayed film formed per one pass of a spraying gun is suppressed to not more than 10 μm;

removing said second mask from said substrate; and forming the solid electrolyte film by thermally treating said second sprayed film.

7. The process according to claim 6, wherein the interconnector and the solid electrolyte film are formed simultaneously by thermally treating said first sprayed film and said second sprayed film.

8. The process according to claim 1, wherein said substrate is an air electrode substrate of a self-supporting type.

9. The process according to claim 1, wherein said substrate has one of a tubular shape with opposite ends opened and a tubular shape with one end opened and the other end closed.

10. The process according to claim 1, wherein the surface treatment of the substrate is effected by increasing the surface roughness of the substrate with one of a sandpaper and a grinding stone.

11. The process according to claim 1, wherein said substrate is preheated at a temperature of not less than 120° C.

12. The process according to claim 1, wherein said mask is made of a glass cloth tape impregnated with Teflon.

13. The process according to claim 1, wherein when the material for the formation of the electrically conductive film is to be sprayed onto the substrate, the spraying gun is moved at a speed of 50–200 mm/sec. and the substrate is rotated at 500 to 1000 rpm to suppress a thickness of the sprayed film per one pass to not more than 10 μm.

14. The process according to claim 1, wherein the material for the formation of the electrically conductive film is sprayed onto the substrate while the substrate is being cooled.

15. The process according to claim 1, wherein the substrate has a bottomed tubular shape, and when the material for the formation of the electrically conductive film is sprayed onto the substrate, the material is successively spay coated onto the substrate from a tubular portion toward a bottom portion thereof, while a distance between said spray gun and a joint portion between said tubular portion and the bottom of the substrate is set at not less than 1.3 times as large as a distance existing between the tubular portion and the spray gun when the tubular portion is being sprayed.

16. The process according to claim 1, wherein the thermal treatment is effected at a temperature of 1300° to 1600° C.

* * * * *